Figures 1, 2:
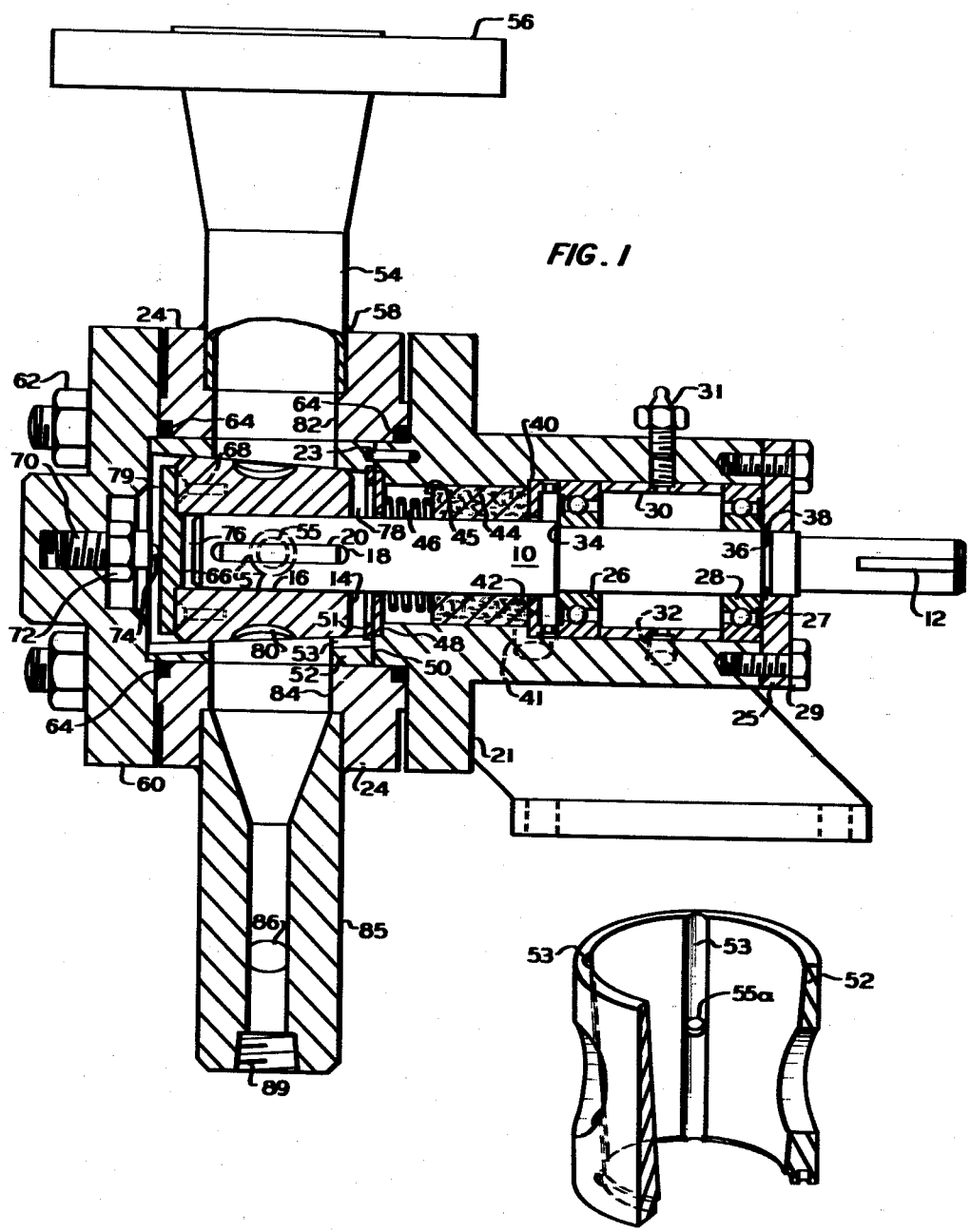

July 7, 1964 R. O. WELTY 3,139,996
ROTARY SOLIDS FEEDER
Filed Oct. 29, 1962

INVENTOR.
R.O. WELTY
BY Young and Quigg
ATTORNEYS

United States Patent Office 3,139,996
Patented July 7, 1964

3,139,996
ROTARY SOLIDS FEEDER
Richard O. Welty, Bartlesville, Okla., assignor to Phillips Petroleum Company, a corporation of Delaware
Filed Oct. 29, 1962, Ser. No. 233,651
3 Claims. (Cl. 214—17)

This invention relates to a rotary solids feeder. In one aspect, the invention relates to an improved feeder for the feeding of particulate catalyst to a catalytic reactor system.

Oftentimes particulate solids must be metered into a system with extreme care. For instance, in the polymerization of olefins, the solid catalyst must be metered into the catalytic reaction system in minute quantities, yet with extreme care since the rate of introduction of catalyst greatly affects not only polymerization rate but also physical properties of the resultant polymer. A number of rotary type feeders particularly adaptable to the feeding of particulate catalyst into a reactor have been proposed. However, it has been found that particulate catalysts, such as chromium oxide deposited on silica or silica-alumina, are exceptionally abrasive and rotary feeders, particularly those employing a rotor and fabricated of metal, suffer excessive attrition. In feeders employing a rotor, it has been found that the wear is apparently at least partially due to the fact that as the cylindrical rotor becomes worn and slightly smaller than originally, particulate catalyst enters the space between the rotor and the adjacent housing so as to increase the rate of wear drastically. In order to overcome this wear, it has been proposed that the rotor be fabricated of a material such as a polymer of tetrafluoroethylene and be constructed with an axial bore fitting the power shaft. This method of attaching the rotor to the shaft sometimes results in improper centering and stripping of the threads, resulting in poor catalyst feed rate uniformity and excessive wash-by. In the copending application of Billy Hadley et al., Serial No. 126,282, filed July 24, 1961, a tapered rotor was provided with construction which applied pressure to the rotor during operation so as to maintain a close tolerance between the rotor surface and the surrounding housing. The tapered rotor was preferably centered on the power shaft by means of keys fixed in the shaft and extending or projecting into cooperative slots in the bore wall of the rotor extending the length of the rotor so that the rotor is slidable on the keys along the shaft. The catalyst is transferred from the feed means to the reactor inlet conduit by means of pockets on the periphery of the rotor.

This invention represents an improvement over feeders in U.S. Patent No. 2,885,246 and the copending application of Hadley et al., supra.

An improved means has now been found for the removal of all of the catalyst particles from the pockets on the rotor so as to prevent any undue collection of these very hard, abrasive substances between the rotor and the tapered bearing surface.

It is an object of the invention to provide an improved apparatus for the feeding of solids.

It is another object of the invention to provide an improved rotary feeder.

It is yet another object of the invention to provide a novel apparatus for the complete removal of solids from a rotary feeder.

These and other objects of the invention will be readily apparent to those skilled in the art from the accompanying disclosure, drawing and appended claims.

Broadly, these objects are accomplished by providing means for flushing the solid particles from the recesses on the rotor.

These objects are accomplished in a feeder for particulate solids comprising a shaft having on one end thereof a co-axial truncated conical rotor, at least one recess on the exterior surface of said rotor intermediate its ends for the conveying of solids introduced thereo, a housing around said shaft and rotor, said housing providing a tapered bearing surface for sealably engaging said rotor, bearing means in said housing for said shaft spaced from said rotor, a solids inlet through said housing leading to the path of said recess when revolving, and a solids outlet through said housing leading from said path and spaced circumferentially from said solids inlet by the improvement comprising a plurality of longitudinal recesses on the interior surface of said tapered bearing extending the length thereof and adjacent the exterior surface of said rotor, at least one of said recesses being in communication with an inlet conduit for the introduction of a flushing fluid and at least one conduit being in communication with the exterior of said housing.

In one aspect at least one of the recesses on the bearing is in communication with said solids outlet.

By the employment of the apparatus of this invention, as hereinafter better described in connection with the drawing, means are provided for introducing a flushing fluid, such as water or a hydrocarbon diluent, e.g., cyclohexane, pentane or liquid propylene, into a longitudinal recess in the tapered bearing surface, said fluid preferably entering said recess through an opening through said tapered bearing. The fluid then passes through the longitudinal recess to either end of the rotor. Since the recess is adjacent the rotor, the fluid is in contact with the rotating rotor and the particulate solids or catalyst are washed from the pockets and off the surface of the rotor and flushed into the open space at either end of the rotor. The fluid then is permitted to enter another longitudinal recess in the inner surface of the tapered bearing, said recess being in communication with the exterior of the housing; preferably this longitudinal recess is in communication with the solids outlet so that the solids and fluid are rejected into the reactor or the like along with the solids conveyed thereto in the pockets or recesses on the exterior surface of the rotor.

It will be readily apparent to those skilled in the art that any number of longitudinal recesses may be employed so long as one of them is in communication with a conduit introducing a flushing fluid and at least one recess is in communication with the exterior of the housing for the removal of the flushed solids. The dimensions of the recesses depend entirely on the size of the apparatus and the amount of catalyst involved. For example, when employing a rotor having ¼-inch dimples for conveying the solids and a tapered bearing 3.033 inches long, the recesses may be ⅛-inch radius grooves ⅛ inch deep.

It is important that the direction of rotation of the rotor be taken into consideration when positioning the recesses so that the flushing liquid will enter and exit at the proper conduit.

This invention is broadly applicable to any rotary feeder for the metering of particulate solids although the invention will be described herein with particular reference to the rotor described in the copending application of Hadley et al., supra.

A more complete understanding of the invention can be obtained by reference to the accompanying schematic drawing of which FIGURE 1 is a vertical longitudinal partial section of a rotary feeder for particulate solids constructed in accordance with the invention, and FIGURE 2 is a pictorial illustration of the tapered bearing showing the recesses thereon. The reference numerals employed in the different figures are identical for identical compounds.

Referring to FIGURE 1, the feeder shown comprises a shaft 10 having a key slot 12 for a power drive hookup. A tapered rotor 14 in the form of a frustum of a cone is fabricated with an axial bore so that the rotor is slidable onto shaft 10. Shaft 10 is provided with 3 keyways 18 positioned 120° apart and each is fitted with a key 20 which is snugged into the keyway. Keyways or grooves (not shown) are cut in rotor 14 the full length of the bore 16 so that the keys are in sliding engagement with the keyway in the rotor. This construction permits the rotor to be slid into the end of the shaft while the keys are in position therein and movement of the rotor farther onto the shaft as the rotor becomes worn or the surrounding bearing surface becomes worn.

A housing 24 surrounds rotor 14 and a portion of the shaft 10. A housing 21 surrounds the other end of shaft 10. Housing 21 is fixably positioned in relation to housing 24 by means of a dowel pin 23. By this construction and the positioning of the shoulder and bearings as hereinafter described, it has been found that the packing and bearing are more readily acceptable and it is not necessary to remove the entire rotor and shaft from the rotor end. A flange 25 is provided for enclosing the open end of the housing 21 by means of screws 29. A pair of ball bearings 26 and 28 are positioned on either side of a collar 30 which is set on shaft 10 in fixed relation thereto. The ball bearings are slidably mounted on the shaft with shields 27. The shaft 10 is then retained in place by means of a retaining snap ring 38 positioned in recess 36. A lubrication fitting 31 is provided for the lubrication of the bearings 26 and 28 with pressure relief being provided in vent 32. A rimmed washer 40 is positioned at the rotor end of the bearing 26 in the housing and a chevron type packing-ring assembly 44 surrounds the shaft and is forced against washer 40 by spring 46 against bearing surface 45 of packing 44. A recess 42 is provided between washer 40 and bearing 26 for the discharge of fluid which may by-pass the packing 44. This fluid can then be discharged through orifice 41 and thus prevents the washing of lubricant from the bearing area. A flat washer 48 seats on shoulder 50 of the housing to hold spring 46 in compression against the packing-ring assembly 44. A snap ring 51 is provided to hold washer 48 in place.

The interior of the rotor housing is provided with a replaceable sleeve 52 which is tapered to fit the surface of rotor 14 to provide a bearing surface therefor. This sleeve is machined to be slidably engageable with the inside of the housing so as to be removable therefrom. Recesses 53 are provided longitudinally in said sleeve on bearing surface. These longitudinal recesses are so positioned that at least one recess is in communication with a conduit furnishing a flushing fluid and at least one recess is in communication with the exterior of the housing. The preferred embodiment employs a conduit 55 which may contain a pipe tap 57. This conduit 55 aligns with an opening 55A through the bearing surface 52 and is in communication with one of the recesses 53. The other recess is preferably in direct communication with the openings 78 and 79 at either end of the rotor 14 and with the discharge solids conduit 84.

The end of the housing comprises a cap or cover 60 which is attached to the end of the rotor housing by socket cap type screws 62. A gasket 64 forms a seal between cap 60 and the end of the housing. In order to apply compression on the end of rotor 14, a cover plate 66 is attached to the outer end of rotor 14 by means of screws 68 and an axial spring plunger 70 is threaded into cap 60 and locked therein by lock nut 72. In this manner plunger element 74 is forced against cover plate 66 and this force is transmitted to rotor 14 so that it maintains a close engagement with sleeve 52. O-rings 64 are provided to ease separation and assembly of sections 21 and 24.

It should be noted that rotor 14 and sleeve 52 should be fabricated so that rotor 14 extends beyond the end of shaft 10 to provide a take-up space 76 in bore 16 and a space 78 between the rotor 14 and flat ring 48 for take-up.

Rotor 14 is provided with pockets or dimples or other suitable receptacle 80 spaced in circumferential alignment around the outer surface of the rotor so that these pockets rotate in a common plane. A threaded inlet 82 and a threaded outlet 84 provide for attachment of inlet and outlet conduits for feeding powdered material to and delivering same from the rotor, respectively.

With cap 60 removed from the end of the rotor housing the rotor shaft assembly may be removed through the end of the housing by the simple removal of snap ring 38. It is also feasible to remove or to obtain access to the packing 44 by the simple expedient of the removal of cap screws 29 and flange 25. This eliminates the necessity for the removal of the entire rotor and shaft for a simple replacement of a bearing or packing.

The rotor is preferably tapered at an angle of 3° with the axis substantially as shown in the drawing. The sleeve or bearing surface 52 is also tapered at said angle or an angle commensurate with said tapered rotor surface.

The particulate solid is introduced into the cavities or pockets 80 from conduit 82. It has been found preferable to provide a pipe fitting appropriate to the fittings of the pipe carrying the incoming catalyst. As shown, the pipe may be attached by means of flange 56 to the appropriate incoming conduit. Said flange 56 is attached to conduit 54 which in turn is welded to housing 24 by means of weld 58. The discharge of the particulate solids from cavity 80 is effected into a discharge conduit 84 which is in communication with the reactor or the like through conduit 89. A suitable alternate opening 86 is provided in body member 85 for the cleaning or for other inspection purposes of conduit 84.

The rotor is advantageously fabricated out of polytetrafluoroethylene. Other solid resins may be utilized, including high density polyethylene, polychlorotrifluoroethylene, nylon, etc. Polytetrafluoroethylene has been found to be the most suitable in service in feeding particulate chromium oxide-silica-alumina catalyst to a reactor in use in polymerizing ethylene.

This invention has particular advantages when employed in combination with a heat balance computer system which particularly senses a value representing the rate of conversion of the feed supplied by the rotor feeder of this invention with the rate of incremental feeding of catalyst to the reactor being varied in response to the sensed value to maintain feed values substantially constant.

The process has been described herein with particular reference to the catalytic polymerization of alpha olefins but is also applicable to any process requiring the metering of solids to a vessel, e.g. other catalytic reactions such as isomerization, alkylation, cracking, hydrogenation, dehydrogenation, and the like.

Although a number of apparatus features and modifications have been illustrated, it is believed obvious that modifications of the invention will become readily apparent to those skilled in the art and the illustrative details disclosed are not to be construed as imposing unnecessary limitations on the invention.

What I claim is:

1. A feeder for particulate solids comprising a shaft having on one end thereof a coaxial truncated conical rotor, at least one cavity in said rotor intermediate its ends for receiving and delivering solids fed thereto; a housing around said shaft and rotor, said housing providing a tapered bearing surface for sealably engaging said rotor; bearing means in said housing for said shaft spaced from said rotor; a solids inlet thru said housing leading to the path of said cavity when revolving; a solids outlet thru said housing leading from said path and spaced circumferentially from said solids inlet; and a plurality of longitudinal recesses in communication with each other on the interior surface of said bearing extending the length thereof and adjacent to said rotor, at least one of said recesses being in communication with an inlet conduit for the introduction of a flushing fluid and at least one conduit being in communication with the exterior of said housing for the removal of said flushing fluid.

2. A feeder for particulate solids comprising a shaft having on one end thereof a coaxial truncated conical rotor, the end of said rotor of large diameter being adjacent said one end, and said one end of said shaft terminating at said rotor; at least one cavity in said rotor intermediate its ends for receiving and delivering solids fed thereto; means for attaching said rotor to said shaft for rotation with said shaft; a housing around said shaft and rotor open at the rotor end so that the shaft and rotor assembly is insertable thru the open-ended housing, said housing providing a tapered bearing surface for sealably engaging said rotor; bearing means in said housing for said shaft spaced from said rotor; a cap detachably affixed to and covering the open end of said housing; flexible means in said cap for applying pressure on the outer end of said rotor to hold same in sealing engagement with said bearing surface; a solids inlet thru said housing leading to the path of said cavity when revolving; a solids outlet thru said housing leading from said path and spaced circumferentially from said solids inlet; and a plurality of longitudinal recesses in communication with each other on the interior surface of said bearing extending the length thereof and adjacent to said rotor, at least one of said recesses being in communication with an inlet conduit for the introduction of a flushing fluid and at least one conduit being in communication with the exterior of said housing for the removal of said flushing fluid.

3. A catalyst feeder for particulate solid catalyst comprising a metal shaft having on one end thereof a coaxial truncated conical rotor having an axial bore for said shaft, the end of said rotor of larger diameter extending beyond said one end to provide a short open space in said bore; a plurality of pockets spaced apart in circumferential alignment on said rotor for receiving and delivering solids; a plurality of keys fixed longitudinally in said shaft and extending into corresponding slots in said rotor extending from end to end thereof to provide for sliding said rotor longitudinally on said shaft during rotation thereof; a housing around said shaft and rotor having a removable cap on the rotor end thereof to permit insertion and withdrawal of said shaft and rotor thru said end, said shaft extending thru the other end of said housing; an open space at either end between the housing and the rotor; a tapered bearing surface in said housing for sealably engaging said rotor; bearing means in said housing for said shaft spaced from said rotor; means for preventing axial displacement of said shaft away from said rotor; a cover on the open end of said rotor; an axial spring-actuated plunger in said cap biased against said cover to hold said rotor in engagement with said tapered bearing surface; and an inlet and an outlet thru said housing for introducing said catalyst to and removing same from said pockets, and a pair of longitudinal recesses on the interior surface of said bearing extending the length thereof and adjacent to said rotor, one of said recesses being in communication with an inlet conduit for the introduction of a flushing fluid and one recess being in communication with said solids outlet, said longitudinal recesses being in communication with each other through the open space at either end between the housing and rotor.

References Cited in the file of this patent

UNITED STATES PATENTS

| 2,766,911 | Greaves et al. | Oct. 16, 1956 |
| 2,792,152 | Crowley et al. | May 14, 1957 |
| 2,960,245 | Knapp | Nov. 15, 1960 |